(12) United States Patent
Fruge et al.

(10) Patent No.: US 7,622,170 B2
(45) Date of Patent: *Nov. 24, 2009

(54) COATING COMPOSITION COMPRISING COLLOIDAL SILICA AND GLOSSY INK JET RECORDING SHEETS PREPARED THEREFROM

(75) Inventors: Daniel Ray Fruge, Wilmington, DE (US); Demetrius Michos, Clarksville, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/391,044

(22) Filed: Mar. 18, 2003

(65) Prior Publication Data

US 2003/0180480 A1    Sep. 25, 2003

Related U.S. Application Data

(60) Provisional application No. 60/365,617, filed on Mar. 19, 2002.

(51) Int. Cl.
*B41M 5/40* (2006.01)

(52) U.S. Cl. .............. 428/32.34; 428/32.29; 428/32.33; 428/32.36; 428/32.37

(58) Field of Classification Search .............. 428/32.33, 428/32.34, 32.36, 32.37, 32.29
See application file for complete search history.

(56) References Cited

U.S. PATENT DOCUMENTS

| 2,244,325 | A |   | 6/1941 | Bird | 252/313 |
| 2,574,902 | A | * | 11/1951 | Snyder et al. | 516/81 |
| 2,577,484 | A |   | 12/1951 | Rule | 252/313 |
| 2,577,485 | A | * | 12/1951 | Rule | 516/81 |
| 2,631,134 | A |   | 3/1953 | Iler | 252/313 |
| 2,750,345 | A |   | 6/1956 | Alexander | 252/313 |
| 2,773,028 | A |   | 12/1956 | Monet | 210/8.5 |
| 2,892,797 | A |   | 6/1959 | Alexander et al. | 252/313 |
| 3,012,972 | A |   | 12/1961 | Rule | 252/313 |
| 3,440,174 | A |   | 4/1969 | Albrecht | 252/313 |
| 3,969,266 | A |   | 7/1976 | Iler | 252/313 |
| 4,536,420 | A | * | 8/1985 | Rickert, Jr. | 427/257 |
| 5,576,088 | A |   | 11/1996 | Ogawa et al. | 428/327 |
| 5,756,226 | A | * | 5/1998 | Valentini et al. | 428/32.35 |
| 5,966,150 | A | * | 10/1999 | Lester et al. | 347/43 |
| 6,086,700 | A | * | 7/2000 | Valentini et al. | 156/235 |
| 6,183,844 | B1 | * | 2/2001 | Li | 428/32.25 |
| 6,309,709 | B1 | * | 10/2001 | Valentini et al. | 427/393.5 |
| 6,497,940 | B1 | * | 12/2002 | Valentini et al. | 428/32.25 |
| 2002/0034613 | A1 | * | 3/2002 | Liu et al. | 428/195 |
| 2003/0180478 | A1 | * | 9/2003 | Fruge et al. | 428/31 |
| 2003/0180480 | A1 | * | 9/2003 | Fruge et al. | 428/32.1 |
| 2003/0180483 | A1 | * | 9/2003 | Fruge et al. | 428/32.33 |
| 2003/0198759 | A1 | * | 10/2003 | Fruge et al. | 428/32.1 |

FOREIGN PATENT DOCUMENTS

| EP | 0 586 846 | 3/1994 |
| EP | 0 685 344 | 12/1995 |
| EP | 0 759 365 | 2/1997 |
| EP | 1 008 457 | 6/2000 |
| EP | 1 016 546 | 7/2000 |
| WO | 00 20221 | 4/2000 |

OTHER PUBLICATIONS

Grace Davison Product Information, LUDOX SM.*
G. W. Sears, Jr., Analytical Chemistry, vol. 28, p. 1981 (1956).

* cited by examiner

*Primary Examiner*—Betelhem Shewareged
(74) *Attorney, Agent, or Firm*—William D. Bunch

(57) ABSTRACT

A coating composition comprising low sodium containing colloidal silicas and ink jet recording sheets prepared from such coatings are described. The coating comprises binder and colloidal silica preferably having an average particle size in the range of about 1 to about 300 nanometers and which has a solids to alkali metal ratio of at least the sum of AW(−0.013SSA+9), AW being the atomic weight of alkali metal present in the colloidal silica and SSA being the specific surface area of the silica. It has been discovered that if the alkali metal, e.g., sodium, content of colloidal silica is reduced, coatings prepared from such colloidal silica and applied to conventional ink jet recording sheet supports provide a specular gloss of at least 30 at 60° C., even at a relatively high silica solids to binder solids ratio of 1:1 or greater.

13 Claims, 2 Drawing Sheets

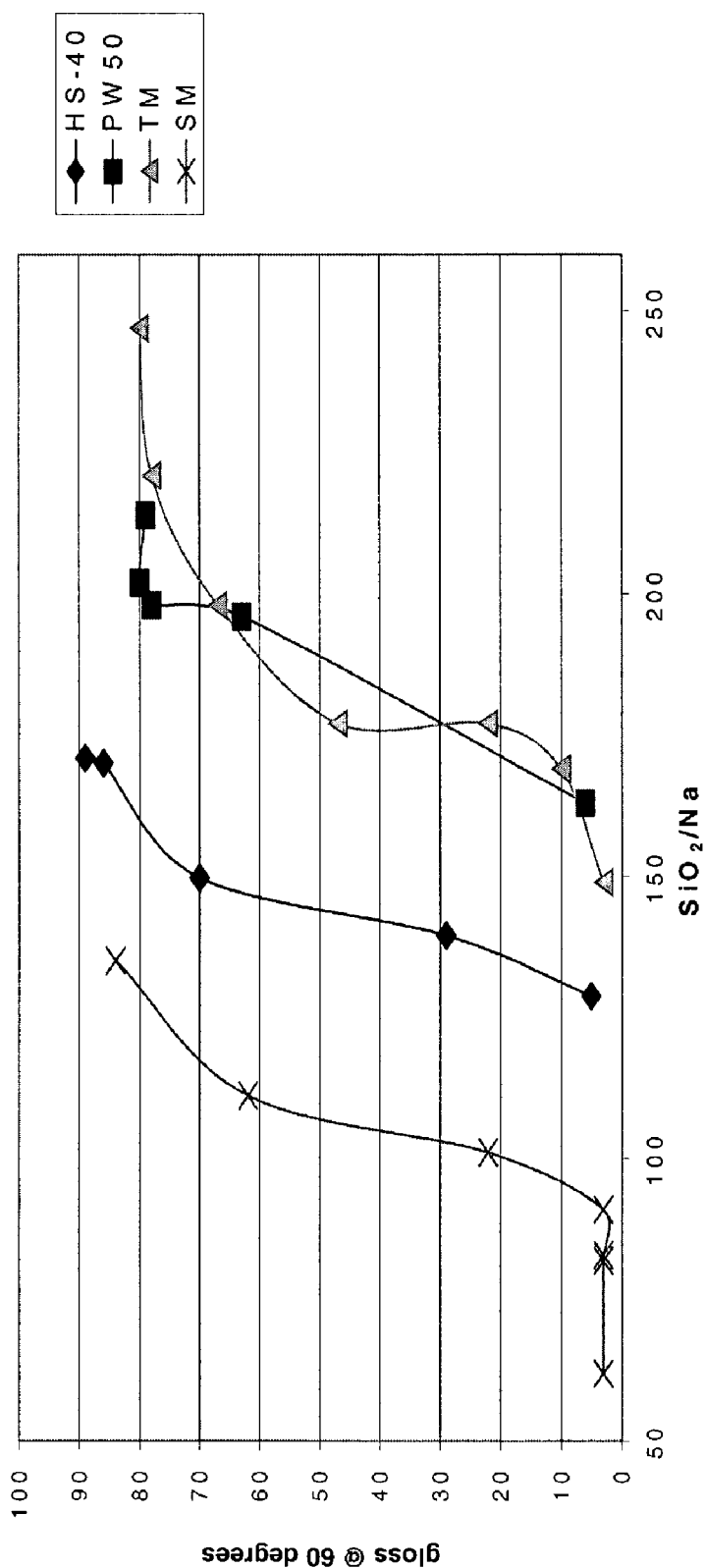

COATING COMPOSITION COMPRISING COLLOIDAL SILICA AND GLOSSY INK JET RECORDING SHEETS PREPARED THEREFROM

This application claims priority under 35 U.S.C. § 119 of the following provisional application Ser. No. 60/365,617 and filing date Mar. 19, 2002

BACKGROUND OF THE INVENTION

The present invention relates to coated ink jet recording sheets and coating compositions used to prepare the same. In particular, the invention relates to coating compositions suitable for preparing glossy ink jet recording sheets which possess good printability characteristics.

Ink jet printing processes are well known. Such systems project ink droplets onto a recording sheet, e.g., paper, at varying densities and speed. When using multi-color ink jet systems, the process projects in very close proximity a number of different colored inks having varying properties and absorption rates. Indeed, these multi-color systems are designed to provide images which simulate photographic imaging, and such images require high resolution and color gamut. Accordingly, ink jet recording sheets must be able to absorb ink at high densities, in a capacity such that the colors deposited are bright and clear, at rates to effect quick drying, absorb ink so that it does not run or blot, and in a manner that results in smooth images.

To meet these goals, highly porous pigments, e.g., porous silicas, have been incorporated into paper coatings. Such silica-based coating systems have been successful in meeting the printability goals. However, it has been difficult to obtain such properties and produce a non-matted, or glossy, finish typically seen in traditional photographic systems. The aforementioned porous pigments typically have porosities above 1 cc/g and have average particle sizes greater than 1 micron. Such particle sizes and porosities increase the surface roughness of the finished coating, thereby deflecting incident light so that it is scattered, thereby matting the coating.

To enhance the glossiness of such coatings, second gloss layers are provided on top of ink receptive layers prepared from the aforementioned porous pigments. These top layers are prepared from binder systems that are inherently glossy, or from layers comprising binder and much smaller sized inorganic oxide particles, e.g., conventional colloidal silica. The colloidal silica in the latter approach tends to enhance the ink receptive nature of the top coating, but are not large enough to cause surface deformations. There is, however, a tendency for the colloidal particles to agglomerate at high concentrations, thereby causing imperfections and surface roughness in the top layer, and thereby reducing gloss. Accordingly, lower concentrations (i.e., lower ratios of colloidal solids to binder solids) have been used when employing this approach.

It would therefore be quite desirable to increase the amounts of solid inorganic oxides in these top layers to further improve printability. Indeed, it would be desirable to use coating layers having at least 1:1 colloidal solids to binder solids ratios, and even more preferable to employ coatings having silica to binder ratios as high as 4:1, yet at the same time attain acceptable gloss.

BRIEF DESCRIPTION OF THE DRAWING

FIG. 2 illustrates the effect of a colloidal silica's solids to alkali (e.g., Na) metal ion ratio (by weight) has on gloss from coatings containing the same. Gloss is measured at 60° using techniques described below.

SUMMARY OF INVENTION

Figure 1:
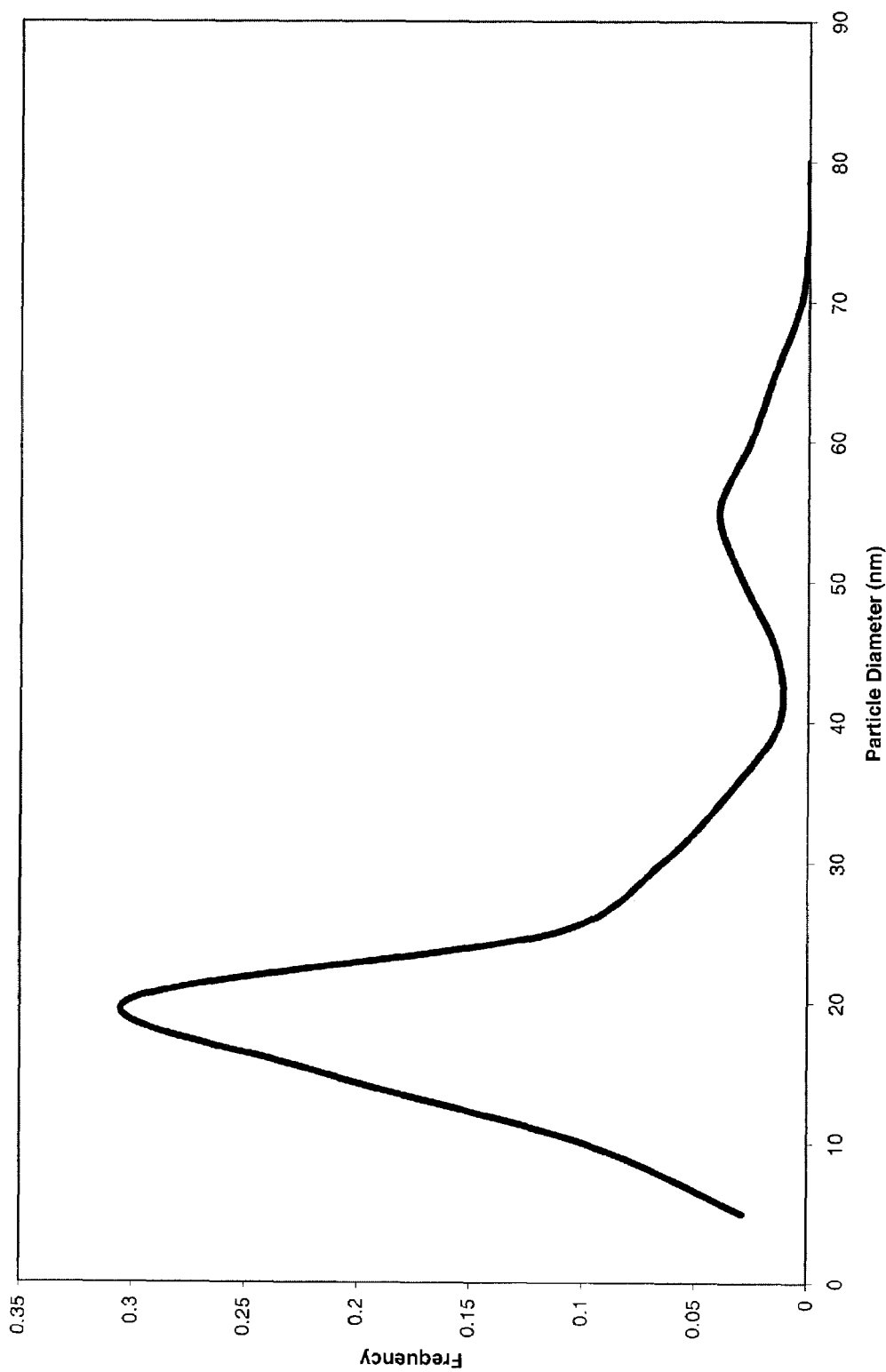
FIG. 1 illustrates the particle size distribution of a polydispersed colloidal silica employed in an embodiment of this invention.

The present invention provides an ink jet recording sheet comprising a support and at least one coating layer thereon, said at least one coating layer (a) having a specular surface gloss of at least 30 at 60°, (b) comprising colloidal silica having a silica solids to alkali metal ratio of at least the sum of AW(−0.013SSA+9), and (c) binder, wherein the colloidal silica solids and binder solids are present at a ratio of at least 1:1 by weight, AW is the atomic weight of the alkali metal and SSA is the specific surface area of the colloidal silica.

Preferably the ratio of colloidal silica solids to binder solids is in the range of about 6:4 to about 4:1.

Preferably the colloidal silica has a silica solids to alkali metal ratio of at least 150.

Preferably the colloidal silica has an average particle size in the range of about 1 to about 300 nanometers.

More preferably, the silica solids to alkali metal ratio is at least the sum of −0.30SSA+207, and the alkali metal is sodium.

A goal of this invention also is a coating composition comprising (a) colloidal silica having a solids to alkali metal ratio of at least the sum of AW(−0.013SSA+9), and (b) binder wherein silica solids of (a) and binder solids of (b) are present at a ratio of at least 1:1 by weight, AW is the atomic weight of the alkali metal and SSA is the specific surface area of the colloidal silica.

Preferably the silica solids of (a) to binder solids of (b) is in the range of about 6:4 to about 4:1.

Preferably the colloidal silica has a silica solids to alkali metal ratio of at least 150.

Preferably the colloidal silica has an average particle size of about 1 to about 300 nanometers.

More preferably, the silica solids to alkali metal ratio is at least the sum of −0.30SSA+207., and the alkali metal is sodium.

Even more preferably, the colloidal silica has a median particle size in the range of 15-100 nm and a particle size distribution such that at least 80% of the particles span a size range of at least 30 nanometers and up to about 70 nanometers.

It has been discovered that colloidal silica having relatively low amounts of alkali metals, e.g., sodium, provides for colloidal silica which does not aggregate at relatively high solids contents, and thereby reduces deformation and matting of the coating surface.

DETAILED DESCRIPTION OF THE INVENTION

By the term "colloidal silica" or "colloidal silica sol" it is meant particles originating from dispersions or sols in which the particles do not settle from dispersion over relatively long periods of time. Such particles are typically below one micron in size. Colloidal silica having an average particle size in the range of about 1 to about 300 nanometers and processes for making the same are well known in the art. See U.S. Pat. Nos. 2,244,325; 2,574,902; 2,577,484; 2,577,485; 2,631,134; 2,750,345; 2,892,797; 3,012,972; and 3,440,174, the contents of which are incorporated herein by reference. Colloidal silicas having average particle sizes in the range of 5 to 100 nanometers are more preferred for this invention. Colloidal silicas can have a surface area (as measured by BET nitrogen adsorption) in the range of 9 to about 2700 m$^2$/g.

A colloidal silica particularly suitable for this invention is what is known as polydispersed colloidal silica. "Polydispersed" is defined herein as meaning a dispersion of particles having a particle size distribution in which the median particle size is in the range of 15-100 nm and which has a relatively large distribution span. Preferred distributions are such that 80% of the particles span a size range of at least 30 nanometers and can span up to 70 nanometers. The 80% range is measured by subtracting the d$_{10}$ particle size from the d$_{90}$ particle size generated using TEM-based particle size measurement methodologies described later below. This range is also referred to as the "80% span." One embodiment of polydispersed particles has particle size distributions which are skewed to sizes smaller than the median particle size. As a result, the distribution has a peak in that area of the distribution and a "tail" of particle sizes which are larger than the median. See FIG. 1. The lower and upper particle size of the span encompassing 80% of the particles can be −11% to −70% and 110% to 160% of the median, respectively. A particularly suitable polydispersed silica has a median particle size in the range of 20 to 30 nanometers and 80% of the particles are between 10 and 50 nanometers in size, i.e., 80% of the distribution has a span of 40 nanometers.

Most colloidal silica sols contain an alkali. The alkali is usually an alkali metal hydroxide the alkali metals being from Group IA of the Periodic Table (hydroxides of lithium, sodium, potassium, etc.) Most commercially available colloidal silica sols contain sodium hydroxide, which originates, at least partially, from the sodium silicate used to make the colloidal silica, although sodium hydroxide may also be added to stabilize the sol against gelation.

The colloidal silica sols of this invention have significantly lower levels of alkali metal ions than most commercially available colloidal silica sols. This can be illustrated by calculating the silica solids to sodium weight ratio of the colloidal silica sol, as shown in Equation 1. Analysis of FIG. 2 shows that acceptable gloss can be obtained from colloidal silica sols using the equation below:

$$SiO_2/Alkali\ Metal \geq AW(-0.013*SSA+9) \quad \text{Equation 1.}$$

The SiO$_2$/alkali metal is the weight ratio of silica solids and alkali metal in the colloidal silica sol. AW is the atomic weight of the alkali metal, e.g., 6.9 for lithium, 23 for sodium, and 39 for potassium, and SSA is the specific surface area of the colloidal silica particles in units of square meters per gram (m$^2$/g). When the alkali metal is sodium, the SiO$_2$/Alkali Metal ratio is at least the sum of −0.30SSA+207.

The silica solids to alkali metal ratios of deionized colloidal silica sols fall within this range and are suitable for this invention. By "deionized," it is meant that any metal ions, e.g., alkali metal ions such as sodium, have been removed from the colloidal silica solution to an extent such that the colloidal silica has a silica solids to alkali metal ratio referred to in Equation 1. Methods to remove alkali metal ions are well known and include ion exchange with a suitable ion exchange resin (U.S. Pat. Nos. 2,577,484 and 2,577,485), dialysis (U.S. Pat. No. 2,773,028) and electrodialysis (U.S. Pat. No. 3,969, 266).

To impart stability of the colloidal silica sol against gelation, the particles may also be surface modified with aluminum as described in U.S. Pat. No. 2,892,797 (the contents therein incorporated herein by reference), and then the modified silica is deionized. Ludox® TMA silica from W. R. Grace & Co.-Conn. having a pH of about 5.0 at 25° C. is an example of commercially available colloidal silica made by this method.

As indicated below, the colloidal silicas can be incorporated in conventional coating binders. The binder not only acts to bind the colloidal silica and to form a film, it also provides adhesiveness to the interface between the gloss-providing layer and the substrate or any intermediate ink-receiving layer between the glossy layer and substrate.

Water-soluble binders are particularly suitable in the present invention and may, for example, be a starch derivative such as oxidized starch, a etherified starch or phosphate starch; a cellulose derivative such as carboxymethyl cellulose or hydroxymethyl cellulose; casein, gelatin, soybean protein, polyvinyl alcohol or a derivative thereof; polyvinyl pyrrolidone, a maleic anhydride resin or a conjugated diene-type copolymer latex such as a styrene-butadiene copolymer or a methyl methacrylate-butadiene copolymer; acrylic polymer latex such as a polymer or copolymer of an acrylic acid ester or a methacrylic acid ester; a vinyl-type polymer latex such as an ethylene-vinyl acetate copolymer; a functional group-modified polymer latex of such a various polymer with a monomer containing a functional group such as a carboxyl group. An aqueous adhesive such as a thermosetting synthetic resin such as a melamine resin or a urea resin; a polymer or copolymer resin of an acrylic acid ester or a methacrylic acid ester such as a polymethyl methacrylate; or a synthetic resin-type binder such as a polyurethane resin, an unsaturated polyester resin, a vinyl chloride-vinyl acetate copolymer, polyvinyl butyral or an alkyd resin may also be used. Water insoluble binders in latex form are also suitable.

The binder can be combined with the colloidal silica using conventional blenders and mixers. The components can be combined and mixed at ambient conditions.

It is desirable for the colloidal silica solids and binder solids to be present in the coating at relatively high ratios. It has been found that in certain embodiments higher silica to binder ratios provide good printability, as well as provide advantageous mechanical properties to the finished ink receptive coating sheet. It is particularly desirable for the colloidal silica and binder solids to be present at a ratio of at least 1:1, and more preferably 6:4 to 4:1 by weight. The ratio can be as high as 9.9:1. The colloidal silica to binder solids ratio is also referred to herein as pigment to binder ratio.

It may also be desirable to include additional components in the coating composition of this invention. The coating of this invention can contain one or more of the following: dispersant, thickener, fluidity-improving agent, defoaming agent, foam-suppressing agent, release agent, blowing agent, penetrating agent, coloring dye, coloring pigment, fluorescent brightener, ultraviolet absorber, anti-oxidant, preservative, ash-preventing agent, waterproofing agent, and wet-strength agent.

A portion of the relatively alkali metal free colloidal silica also can be replaced by one or more other colloidal materials containing alkali metals in larger amounts, provided the total amount of alkali present in the combination of colloidal silica and the other material is such that the silica solids to alkali metal ratio is that given by Equation 1, and the amount of such colloidal material does not detract from the overall gloss desired for the finished coating. These other colloidal materials can be silica, as well as inorganic oxides other than silica, e.g., titania, zirconia, and the like. Such additional inorganic oxide colloidal particles can be added as a filler and/or as additional pigment.

The coatings of this invention have a gloss of at least thirty (30) at 60° according to a BYK Gardner measuring instrument. Preferable coatings according to this invention have a gloss of at least 80 at a 6:4 colloidal silica to binder ratio and at least 50, and preferably at least 70 at a 4:1 colloidal silica to binder ratio. Even more preferred, the coating has a gloss of at least 90 at a 4:1 colloidal silica to binder ratio.

Suitable supports for preparing the ink recording sheet of this invention can be those typically used in the art. Suitable supports include those having a weight in the range of about 40 to about 300 g/m². The support may be base paper produced from a variety of processes and machines such as a Fourdrinier paper machine, a cylinder paper machine or a twin wire paper machine. The supports are prepared by mixing its main components, i.e., a conventional pigment and a wood pulp including, for example, a chemical pulp, a mechanical pulp, and a waste paper pulp, with at least one of various additives including a binder, a sizing agent, a fixing agent, a yield-improving agent, a cationic agent and a paper strength-increasing agent. Other supports include transparent substrates, fabrics and the like.

Further, the support may also be size-pressed paper sheets prepared using starch or polyvinyl alcohol. The support can also be one which has an anchor coat layer thereon, e.g., paper already having a preliminary coating layer provided on a base paper. The base paper may also have an ink-receiving layer applied prior to applying the coating of this invention.

Coatings comprising colloidal silica, binder and optional additives can be applied online as the support is being prepared, or offline after the support has been finished. The coating can be applied using conventional coating techniques, such as air knife coating, roll coating, blade coating, bar coating, curtain coating, die coating, and processes using metered size presses. The resulting coatings can be dried by ambient room temperature, hot air drying methods, heated surface contact drying or radiation drying. Typically, the coating composition of the invention, and any optional intermediate layers, is applied in a range of 1 to 50 g/m², but more typically in the range of 2 to 20 g/m².

The examples below show that a glossy ink jet recording sheet having good printability can be prepared essentially from a support and one layer of the invention. However, it may be desirable in certain instances to place another layer, which is ink receptive, between the gloss providing layer of the invention and the support to enhance the printability of the final sheet. For example, sheets coated with a certain deionized colloidal silica would preferably contain a separate ink receptive coating between the gloss layer and the substrate in order to improve the printability of the finished ink jet recording sheet.

Suitable ink receptive layers are those identified as such in U.S. Pat. No. 5,576,088, the contents of which are incorporated herein by reference. Briefly, suitable ink receptive layers comprise a binder such as the water soluble binders listed above, and an ink receptive pigment. Such pigments include a white inorganic pigment such as light calcium carbonate, heavy calcium carbonate, magnesium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, alumina, colloidal alumina, pseudo boehmite, aluminum hydroxide, lithopone, zeolite, hydrolyzed halloysite or magnesium hydroxide, or an organic pigment such as a styrene-type plastic pigment, an acrylic plastic pigment, polyethylene, microcapsules, a urea resin or a melamine resin. Suitable pigments for the ink receptive layer have average particle sizes in the range of 0.5 to 3.0 microns (light scattering) and pore volumes ranging from 0.5 to 3.0 cc/g and preferably pore volumes of 1.0 to 2.0 cc/g, as measured by nitrogen porosimetry. In order to obtain an ink jet recording sheet having a high ink absorptivity, it is preferred that the pigment in the ink-receiving layer contains at least 30 vol. % of particles having a particle size of at least 1.0 µm.

The preferred embodiments, and modes of operation of the present invention have been described in the foregoing specification. The invention which is intended to be protected herein, however, is not to be construed as limited to the particular embodiments disclosed, since they are to be regarded as illustrative rather than restrictive. Variations and changes, therefore, may be made by those skilled in the art without departing from the spirit of this invention.

Further, any range of numbers recited in the specification or claims, such as that representing a particular set of properties, conditions, physical states or percentages, is intended to literally incorporate expressly herein any number falling within such range, including any subset ranges of numbers within any range so recited.

ILLUSTRATIVE EXAMPLES

The parameters listed below and/or indicated earlier were measured as follows:

Average Particle Size—unless indicated otherwise, is a number average particle size determined by the equation $d_n=3100/SSA$ wherein $d_n$ is the number average particle size in nanometers and SSA is the specific surface area described below.

Median Particle Size—is a number weighted median measured by electron microscopy (TEM).

Gloss—measured using a BYK Gardner micro-TRI-gloss instrument which has been calibrated on a transparent film. The gloss values were measured using a 60° geometry.

Alkali metal (e.g., Na) Content—based on alkali metal ion content measured using the inductively coupled plasma-atomic emission (ICP-AES) spectroscopy technique. The sample is first dissolved at ambient conditions, e.g., 25° C. and 75% relative humidity, in hydrofluoric acid and nitric acid (at a 30/70 weight ratio) before applying this technique. The sample was allowed to dissolve for sixteen hours before measurements were taken.

Silica Solids Content—measured in an Ohaus furnace at 205° C., with the end point for the solids measurement being when the sample weight change is less than 0.01 g for sixty (60) seconds.

Specific Surface Area—titrimetric method correlated to surface area by nitrogen adsorption as given by G. W. Sears, Jr., Analytical Chemistry, Vol. 28, p. 1981, (1956).

Printability (or print quality)—is evaluated by observing the appearance of the green, blue and red colored blocks in a printed image prepared from an Epson Stylus 900 color printer after drying the coating using a stream of warm air at 37° C. The methodology for making these observations is as follows:

Color uniformity and bleed were evaluated for each of the colors. The combined rating for the two evaluations is as follows:

Excellent=All colors appear uniform and there is no bleeding outside the print area.

Good=Colors are not completely uniform and bleed occurs in at least one of the color blocks.

Poor=Colors appear non-uniform and ink puddling occurs for at least one color; there also is severe bleeding.

Example 1

(Comparison)

A polydispersed colloidal silica (6.40 g; 50 wt % solids) colloidal silica having a median particle size of 22 nanometers, 80% span of 40 nanometers, specific surface area of 70 $m^2/g$ and silica solids to sodium ratio of 179 was placed in beaker and diluted with 9.49 g of DI water. To that 5.16 g of Airvol-523 polyvinyl alcohol (15.5 wt % solution) from Air Products were added. The mixture was blended under ambient conditions. The resulting formulation, which had $SiO_2$/binder =4, was coated as a 100 micron wet film on Melinex (TM)-534 polyester, opaque white film, from E. I. DuPont de Nemours & Co. using a TMI coater (K control coater) with a number 8 rod. The coatings were dried and measured for gloss. The obtained coating had a gloss of 3% at 60 degrees. This low gloss is consistent with Equation 1, which indicates that SiO2/Na must be $\geq$186 for acceptable gloss. The same components were similarly combined to make coatings at a variety of other pigment to binder ratios, and then dried and measured for gloss. Those measurements also appear in Table 1.

Example 2

The polydispersed silica of Example 1 was aluminum stabilized using the method described in U.S. Pat. No. 2,892,797, the contents of which are incorporated by reference. The resulting colloidal silica sol was then deionized to pH 3.0-3.5 and adjusted with deionized water to make a sol containing 40% silica and having a silica solids to sodium ratio of 320. 10.0 g of this sol were placed in a beaker and diluted with 9.86 g of DI water. To that 6.45 g of Airvol-523 (15.5 wt % solution) were added. The resulting formulation was coated and dried on polyester film. The obtained coating had a gloss of 51% at 60 degrees. The same components were similarly combined at a variety of other pigment to binder ratios, with coatings therefrom measured for gloss. Those measurements also appear in Table 1. This gloss is consistent with Equation 1, which indicates that $SiO_2$/Na must be $\geq$186 for acceptable gloss.

Example 3

(Comparison)

Ludox® HS-40 (10.54 g; 40 wt % solids) having a specific surface area=220 $m^2/g$ and a silica solids to sodium ratio of 131 was placed in beaker and diluted with 10.36 g of DI water. To that 6.76 g of Airvol-523 (15.5 wt % solution) were added. The resulting formulation was coated on polyester film. The obtained coating had a gloss of 3% at 60 degrees. The same components were similarly combined at a variety of other pigment to binder ratios, with coatings therefore again measured for gloss. Those measurements also appear in Table 1. This relatively low gloss is consistent with Equation 1, which indicates that $SiO_2$/Na must be $\geq$141 for acceptable gloss.

Example 4

11.05 g of Ludox® TMA (34 wt % solids) having specific surface area of 140 $m^2/g$ and a silica solids to sodium ratio of 572 was diluted with 7.60 g of deionized water. To that 6.05 g of Airvol-523 (15.5 wt % solution) were added. The resulting formulation was coated on polyester film. The obtained coating had a gloss of 85% at 60 degrees. This result is consistent with Equation 1, which indicates that $SiO_2$/Na must be $\geq$165 for high gloss.

Example 5

(Comparison)

Ludox® SM (13.70 g; 30 wt. % solids) having specific surface area of 345 $m^2/g$ and a silica solids to sodium ion ratio of 72 was placed in a beaker and diluted with 6.71 g of deionized water. To that, 6.63 g of Airvol-523 (15.5 wt. % solution) were added. The resulting formulation was coated on polyester film. The obtained coating had a gloss of 3% at 60 degrees. This relatively low gloss is consistent with Equation 1, which indicates that $SiO_2$/Na must be $\geq$104 for acceptable gloss.

Example 6

The polydispersed colloidal silica of Example 1 (30 g; 50 wt. % solids) was placed in a beaker. Amberlite® 120 (plus) ion exchange resin, a product of Rohm & Haas, (hydrogen form) was slowly added, with agitation, until the pH of the colloidal silica was lowered to pH=2.6. This pH was maintained for 1 hour by the addition of small amounts of ion-exchange resin. Then, the resin was separated from the colloidal silica via filtration. 6.01 g of the above prepared material (50 wt. % solids) having a silica solids to sodium ion ratio of 333 was placed in a beaker and diluted with 11.21 g of deionized water. To that, 4.84 g of Airvol-523 (15.5 wt. % solution) were added. The resulting formulation was coated on polyester film. The obtained coating had a gloss of 76% at 60 degrees. This high gloss is consistent with Equation 1, which indicates that $SiO_2$/Na must be $\geq$186 for acceptable gloss.

Example 7

Ludox® HS-40 (30 g; 40 wt. % solids) colloidal silica having specific surface area of 220 $m^2/g$ and silica solids to sodium ion ratio of 131 was placed in a beaker. Amberlite® 120 (plus) ion exchange resin, a product of Rohm & Haas, (hydrogen form) was slowly added, with agitation, until the pH of the colloidal silica was lowered to pH=2.6. This pH was maintained for 1 hour by the addition of small amounts of ion-exchange resin. Then, the resin was separated from the colloidal silica via filtration. 7.51 g of the above prepared material (40 wt. % solids) having a silica solids to sodium ion ratio of 388 was placed in a beaker and diluted with 9.76 g of deionized water. To that, 4.90 g of Airvol-523 (15.5 wt. % solution) were added. The resulting formulation was coated on polyester film. The obtained coating had a gloss of 72% at 60 degrees. This gloss is consistent with Equation 1, which indicates that $SiO_2$/Na must be $\geq$141 for acceptable gloss.

TABLE 1

| Example | Content or Ratio by Weight | | | Gloss at Various Colloidal Silica to Binder Solids | | | | | Printability @ |
|---|---|---|---|---|---|---|---|---|---|
| | % SiO$_2$ | % Na | SiO/Na | 1:4 | 4:6 | 6:4 | 7:3 | 4:1 | 4:1 |
| 1(Comparison)[a] | 50 | 0.28 | 179 | 92 | 89 | 32 | ~ | 3 | ~ |
| 2[b] | 40 | ~ | 320 | ~ | ~ | ~ | 73 | 51 | Good |
| 3(Comparison)[c] | 40 | 0.304 | 131 | 95 | 71 | 8 | ~ | 3 | ~ |
| 4[d] | 34 | 0.0594 | 572 | ~ | ~ | ~ | 88 | 85 | Poor |
| 5(Comparison)[e] | 30 | 0.415 | 72 | ~ | ~ | 3 | ~ | 3 | ~ |
| 6 | 50 | 0.150 | 333 | ~ | ~ | 77 | ~ | 76 | Good |
| 7 | 40 | 0.103 | 388 | ~ | [b]~ | 75 | ~ | 72 | Poor |

[a]Median Particle Size is 22 nm; Specific Surface Area = 70 m$^2$/g.
[b]Median Particle Size is 22 nm; Specific Surface Area = 70 m$^2$/g
[c]Average Particle Size is 12 nm; Specific Surface Area = 220 m$^2$/g
[d]Average Particle Size is 22 nm; Specific Surface Area = 140 m$^2$/g
[e]Average Particle Size is 7 nm; Specific Surface Area = 345 m$^2$/g
[f]"~"indicates that sample was not prepared and evaluated
Printability: Relative Rating Based on the appearance of Green, Blue and Red Colors; Epson 900 Printer.

Example 8

Ludox® HS-40 was deionized to pH=3.0-3.5 using the hydrogen form of Amberlite® 120 (plus) ion exchange resin, a product of Rohm & Haas. Then NaOH were added in amounts indicated below in Table 2. 1% NH$_4$OH was added to a final pH of 9.1. Coatings were then prepared in a manner similar to that described in the earlier examples wherein each silica solids to binder solids ratio was 80/20=silica/Airvol-523. The sodium ion content, SiO$_2$ solids content and Na$_2$O were also measured for each sample of deionized and/or NaOH modified colloidal silica. The results and the resulting silica solids content to alkali metal ion ratio are reported in Table 2 below. These ratios (SiO$_2$/Na) versus gloss are illustrated graphically in the Figure. The gloss values reported in Table 2 and FIG. 2 were measured at 60°.

TABLE 2

| NaOH (g) | Gloss | % Na | % SiO$_2$ (TV) | SiO$_2$/Na | % Na$_2$O |
|---|---|---|---|---|---|
| 0 | 88 | ~ | ~ | ~ | ~ |
| 0.8 | 87 | ~ | ~ | ~ | ~ |
| 1.61 | 89 | ~ | ~ | ~ | ~ |
| 3.23 | 90 | ~ | ~ | ~ | ~ |
| 4.84 | 91 | ~ | ~ | ~ | ~ |
| 6.46 | 91 | ~ | ~ | ~ | ~ |
| 8.07 | 89 | 0.141 | 24.1 | 170.9 | 0.190 |
| 9.10 | 86 | 0.150 | 25.5 | 170.0 | 0.202 |
| 10.02 | 70 | 0.157 | 23.5 | 149.7 | 0.212 |
| 11.73 | 29 | 0.167 | 23.3 | 139.5 | 0.225 |
| 13.44 | 5 | 0.180 | 23.2 | 128.8 | 0.243 |

~indicates that a sample was not prepared and measured

Example 9

Ludox® TM (50 wt. % solids) colloidal silica having specific surface area of 140 m$^2$/g was placed in a container. Amberlite® 120 (plus) ion exchange resin, a product of Rohm & Haas, (hydrogen form) was slowly added, with agitation, in order to remove a fraction of the sodium present in the slurry. Then, a portion of the colloidal silica/resin slurry was removed to the sodium level indicated in Table 3 below, and the resin was separated from the colloidal silica via This sample was used for gloss evaluations. Additional resin was added to the original slurry, in order to further remove sodium to the additional levels indicated in Table 3. Then another portion of the colloidal silica/resin slurry was removed for evaluation. The samples were analyzed for sodium content, and the gloss of the formulations made at a silica solids to binder solids ratio of 4:1 was measured. The resulting formulation was coated on polyester film. The sodium content and the gloss values obtained are shown in Table 3 and illustrated graphically in the Figure.

TABLE 3

(Ludox® TM silica)

| Gloss (60°) | % Na | SiO$_2$/Na |
|---|---|---|
| 3 | 0.336 | 149 |
| 10 | 0.296 | 169 |
| 22 | 0.283 | 177 |
| 47 | 0.282 | 177 |
| 67 | 0.252 | 198 |
| 78 | 0.226 | 221 |
| 80 | 0.202 | 247 |

The same methodology was used to evaluate Ludox® SM and the colloidal silica from Example 1. Results for those silicas are shown in Tables 4 and 5, respectively, as well as illustrated graphically in the Figure.

TABLE 4

(Ludox® SM silica)

| Gloss (60°) | % Na | SiO$_2$/Na |
|---|---|---|
| 3 | 0.484 | 62 |
| 3 | 0.368 | 82 |
| 3 | 0.361 | 83 |
| 3 | 0.330 | 91 |
| 22 | 0.296 | 101 |
| 62 | 0.270 | 111 |
| 84 | 0.223 | 135 |

TABLE 5

(Example 1 Colloidal Silica)

| Gloss (60°) | % Na | SiO$_2$/Na |
|---|---|---|
| 6 | 0.306 | 163 |
| 63 | 0.255 | 196 |

TABLE 5-continued (Example 1 Colloidal Silica)

| Gloss (60°) | % Na | SiO$_2$/Na |
|---|---|---|
| 78 | 0.253 | 198 |
| 80 | 0.247 | 202 |
| 79 | 0.234 | 214 |

What is claimed:

1. An ink jet recording sheet comprising a support and at least one coating layer thereon, said at least one coating layer (a) having a specular surface gloss of at least 30 at 60°, (b) comprising colloidal silica having a silica solids to alkali metal ratio of at least the sum of AW(−0.013SSA+9), and (c) binder, wherein the colloidal silica solids and binder solids are present at a ratio of at least 1:1 by weight, AW is the atomic weight of the alkali metal and SSA is the specific surface area of the colloidal silica.

2. An ink jet recording sheet according to claim 1 wherein the ratio of colloidal silica solids to binder solids is in the range of about 6:4 to about 4:1.

3. An ink jet recording sheet according to claim 1 wherein the colloidal silica has a silica solids to alkali metal ratio of at least 150.

4. An ink jet recording sheet according to claim 1 wherein the colloidal silica has an average particle size in the range of about 1 to about 300 nanometers.

5. An ink jet recording sheet according to claim 1 wherein the silica solids to alkali metal ratio is at least the sum of −0.30SSA+207.

6. An ink jet recording sheet according to claim 1 wherein the alkali metal is sodium.

7. A coating composition comprising
(a) colloidal silica having a solids to alkali metal ratio of at least the sum of AW(−0.013SSA+9), and
(b) binder
wherein silica solids of (a) and binder solids of (b) are present at a ratio of at least 1:1 by weight, AW is the atomic weight of the alkali metal and SSA is the specific surface area of the colloidal silica, and when coated on a support forms a layer that possesses a specular surface gloss of at least 30 to 60°.

8. A coating composition according to claim 7 wherein the silica solids of (a) to binder solids of (b) is in the range of about 6:4 to about 4:1.

9. A coating composition according to claim 7 wherein the colloidal silica has a silica solids to alkali metal ratio of at least 150.

10. A coating composition according to claim 7 wherein the colloidal silica has an average particle size of about 1 to about 300 nanometers.

11. A coating composition according to claim 7 wherein the silica solids to alkali metal ratio is at least the sum of −0.30SSA+207.

12. A coating composition according to claim 11 wherein the alkali metal is sodium.

13. A coating composition according to claim 7 wherein the colloidal silica has a median particle size in the range of 15-100 nm and a particle size distribution such that at least 80% of the particles span a size range of at least 30 nanometers and up to about 70 nanometers.

* * * * *